(12) United States Patent  
Horiuchi et al.

(10) Patent No.: US 8,582,064 B2  
(45) Date of Patent: Nov. 12, 2013

(54) LIQUID CRYSTAL DISPLAY DEVICE

(75) Inventors: Satoshi Horiuchi, Osaka (JP); Takaharu Yamada, Osaka (JP); Yuhko Hisada, Osaka (JP); Ryohki Itoh, Osaka (JP); Masahiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 22 days.

(21) Appl. No.: 13/518,220

(22) PCT Filed: Dec. 21, 2010

(86) PCT No.: PCT/JP2010/073015  
§ 371 (c)(1),  
(2), (4) Date: Jun. 21, 2012

(87) PCT Pub. No.: WO2011/078173  
PCT Pub. Date: Jun. 30, 2011

(65) Prior Publication Data  
US 2012/0262640 A1    Oct. 18, 2012

(30) Foreign Application Priority Data  
Dec. 25, 2009   (JP) .................................. 2009-296003

(51) Int. Cl.  
*G02F 1/1337*   (2006.01)

(52) U.S. Cl.  
USPC ....................................................... 349/129

(58) Field of Classification Search  
USPC ....................................................... 349/129  
See application file for complete search history.

(56) References Cited

U.S. PATENT DOCUMENTS

| 6,724,452 | B1 | 4/2004 | Takeda et al. |
| 6,958,791 | B2 | 10/2005 | Shimoshikiryo |
| 7,405,789 | B1 | 7/2008 | Sasaki et al. |
| 2002/0036744 | A1 | 3/2002 | Kubo et al. |
| 2007/0097280 | A1 | 5/2007 | Choi et al. |
| 2008/0024406 | A1 | 1/2008 | Kim et al. |
| 2008/0062108 | A1 | 3/2008 | Kim |
| 2010/0328558 | A1 | 12/2010 | Asada et al. |
| 2011/0075087 | A1 | 3/2011 | Morinaga et al. |
| 2011/0273653 | A1 | 11/2011 | Yoshida et al. |

FOREIGN PATENT DOCUMENTS

| JP | H11-242225 A | 9/1999 |
| JP | 2000-155317 A | 6/2000 |
| JP | 2001-51298 A | 2/2001 |
| JP | 2002-122886 A | 4/2002 |

(Continued)

*Primary Examiner* — Phu Vu  
(74) *Attorney, Agent, or Firm* — Chen Yoshimura LLP

(57) ABSTRACT

Disclosed is an MVA type liquid crystal display device (LCD 100A) forming four domains in which liquid crystal molecules fall in different directions that are about 90° apart. The MVA type liquid crystal display device includes a plurality of pixels arranged in a matrix of rows and columns, which pixels are horizontally long pixels having longer sides extending in the row direction. Each pixel includes two first electrodes (21a and 21b) arranged side by side along the row direction. Preferably, at least one of the two first electrodes (21a and 21b) has a first corner section including a first edge that is parallel to the row direction and a second edge that is parallel to the column direction, and the first substrate further includes an electrode layer (16c) overlapping at least a portion of the first edge or the second edge of the first corner section. According to the present invention, display quality deterioration caused by disturbed alignment of liquid crystal molecules occurring near the edges of the pixel electrodes can be suppressed.

17 Claims, 4 Drawing Sheets

(56) References Cited

FOREIGN PATENT DOCUMENTS

| | | |
|---|---|---|
| JP | 2004-62146 A | 2/2004 |
| JP | 2007-128094 A | 5/2007 |
| JP | 2008-33323 A | 2/2008 |
| JP | 2008-65334 A | 3/2008 |
| WO | 2009/130819 A1 | 10/2009 |
| WO | 2009/154031 A1 | 12/2009 |
| WO | 2010/092706 A1 | 8/2010 |

LIQUID CRYSTAL DISPLAY DEVICE

TECHNICAL FIELD

The present invention relates to a liquid crystal display device, and particularly to an MVA type liquid crystal display device.

BACKGROUND ART

MVA (Multi-domain Vertical Alignment) type liquid crystal display devices have wider viewing angle characteristics than TN type liquid crystal display devices. MVA type liquid crystal display devices, therefore, are widely used as liquid crystal display devices for TVs and the like (see Patent Documents 1 and 2, for example). The entire contents disclosed in Patent Documents 1 and 2 are hereby incorporated herein by reference.

MVA type liquid crystal display devices have domain control structures (also called alignment control structures), which are disposed on a pair of substrates facing each other to sandwich a vertical alignment type liquid crystal layer, on the sides facing the liquid crystal layer. With the domain control structures, a plurality of liquid crystal domains having different director alignment directions (tilt directions) are formed. The domain control structures are slits (openings) provided in the electrode or dielectric protrusions (ribs) formed on the electrode on the side facing the liquid crystal layer.

Typically, on each of the pair of substrates, a domain control structure having linear segments extending in two directions crossing each other at a right angle is disposed. When a pair of the substrates are observed from an angle perpendicular to the substrates, the domain control structure formed on one substrate and the domain control structure formed on the other substrate are arranged alternately and in parallel with one another. As a result, when a voltage is applied to the liquid crystal layer at a given pixel, four domains, in which liquid crystal molecules fall in different directions (also called the liquid crystal domain director directions) that are about 90° apart, are formed between the linear domain control structure segments. Typically, four liquid crystal domains are formed, where respective liquid crystal domain directors form a 45° azimuth angle to the polarizing axis (transmission axis) of a pair of polarizing plates disposed in a crossed Nicols arrangement. When azimuth angle of 0° is the polarizing axis direction of one of the polarizing plates (horizontal direction of the display surface (3 o'clock direction of the clock's face), for example) and when the counterclockwise rotation is defined as the positive direction, the azimuth angles of the four liquid crystal domain directors are 45°, 135°, 225°, and 315°. The azimuth angle is hereinafter defined as stated above, unless otherwise indicated.

"Pixel" herein refers to the smallest display unit of the liquid crystal display device. In the case of color display devices, "pixel" refers to the smallest display unit of each primary color (typically, red, green or blue), and is also called "dot."

In general, pixels are arranged in a matrix of rows and columns. Here, "row direction" refers to the horizontal direction of the display surface (azimuth angle is 0° or 180°), and "column direction" refers to the vertical direction of the display surface (azimuth angle is 90° or 270°). A pixel includes a pixel electrode, a liquid crystal layer, and an opposite electrode (common electrode) facing the pixel electrode sandwiching the liquid crystal layer. The pixel electrode has edges (sides) extending in the row direction, and edges (sides) extending in the column direction. The linear domain control structures included in an MVA type liquid crystal display device have segments extending in two directions that cross each other at a right angle to form the above-mentioned four liquid crystal domains. They extend, for example, in the azimuth directions of 45° (225°) and 135° (315°). That is, segments of the linear domain control structure (or structure extension) on the opposite electrode, which segments extending in two directions crossing each other at a right angle, intersect with pixel electrode edges extending in the row or the column directions.

When a potential difference is formed between the pixel electrode and the opposite electrode, a diagonal electrical field (fringe field) is formed near the edges of the pixel electrode. The diagonal electrical field formed along the edge of the pixel electrode makes liquid crystal molecules fall in a direction that crosses the electrode edge at the right angle. Therefore, in the area around the intersection of the domain control structure (or its extension) provided on the opposite electrode and the edges of the pixel electrode extending in the row or column direction, the diagonal electrical field formed near the edge of the pixel electrode disturbs the alignment of the liquid crystal molecules controlled by the domain control structure. If the alignment of the liquid crystal molecules is disturbed, naturally, the display quality is deteriorated.

In order to suppress the disturbance in the liquid crystal molecules alignment in the area around the intersection of the domain control structure (or its extension) disposed on the opposite electrode and the pixel electrode edge extending in the row or column direction, Patent Document 1 discloses a configuration in which a linear supplemental structure is disposed at a location facing the edge of the pixel electrode where the alignment disturbance occurs such that the structure extends in parallel with the edge of the pixel electrode. The supplemental structure may be disposed inside the pixel or outside the pixel. The supplemental structure may be, for example, slits formed in the opposite electrode or dielectric protrusions formed on the opposite electrode on the side facing the liquid crystal layer, whichever used as the domain control structure on the opposite electrode. That is, if the domain control structure is the slits formed on the opposite electrode, slits are used as the supplemental structure, and if the domain control structure is the dielectric protrusions formed on the opposite electrode on the side facing the liquid crystal layer, dielectric protrusions are used as the supplemental structure.

However, because the area where the supplemental structure (slits or dielectric protrusions) is formed does not contribute to the display, any portion of the supplemental structure present in the pixel reduces the transmission accordingly. Also, although disturbance in the alignment of the liquid crystal molecules near the pixel electrode edge is suppressed by the supplemental structure, reduced transmission is unavoidable, because the alignment direction of the liquid crystal molecules around the edge is different from the direction of the domain director set by the domain control structure.

Recently, in order to improve the viewing angle dependency of γ characteristics of the MVA type liquid crystal display device, the applicant disclosed in Patent Document 3 a liquid crystal display device and a driving method that can improve the viewing angle dependency of γ characteristics by dividing a single pixel into a plurality of sub-pixels having different brightness. In particular, the viewing angle dependency of γ characteristics that raises the display luminance of low gradation higher than the prescribed luminance (display becomes whitish) can be improved. Such display or drive may herein referred to as "area gradation display," "area gradation drive," "multi-pixel display," "multi-pixel drive," or the like. The entire contents disclosed in Patent Document 3 are hereby incorporated herein by reference.

Patent Document 3 discloses a liquid crystal display device in which single auxiliary capacitance is provided for a plurality of sub-pixels disposed in a pixel, making an auxiliary capacitance opposite electrode (which is connected to the CS bus line) constituting the auxiliary capacitance electrically independent on a sub-pixel by sub-pixel basis. In this liquid crystal display device, by changing the voltage supplied to the auxiliary capacitance opposite electrode (this is called auxiliary capacitance opposite voltage), different effective voltages are applied to the liquid crystal layer for the individual sub-pixels using the capacity division. Today, MVA type liquid crystal display devices are used to provide the multi-pixel displays for purposes requiring a wide viewing angle characteristics, such as TVs, and the multi-pixel displays are performed in a variety of manners.

Patent Document 4 discloses an MVA type liquid crystal display device having another multi-pixel structure. In the liquid crystal display device disclosed in Patent Document 4, the CS bus line is disposed in parallel with the source bus line extending in the column direction. Two sub-pixel electrodes are provided in each pixel (called first and second pixel electrodes in Patent Document 4), and the overlapping area of one of the sub-pixel electrodes and the CS bus line, and the overlapping area of the other sub-pixel electrode and the CS bus line are different. Because of the difference in the overlapping area of the CS bus line and the individual sub-pixel electrodes, the two sub-pixels have different auxiliary capacitances. As a result, a multi-pixel structure is realized. Approximately rectangular pixels are disposed such that the long sides extend in parallel with the row direction. A pixel disposed such that the long side extend in parallel with the row direction is herein called "horizontally long pixel," and a pixel disposed such that the long side extend in parallel with the column direction is herein called "vertically long pixel."

In a liquid crystal display device having the multi-pixel structure described above, a pixel electrode is divided into a plurality of sub-pixel electrodes that correspond to the plurality of sub-pixels. That is, the plurality of sub-pixel electrode constitute a pixel electrode. A plurality of sub-pixel electrodes are sometimes provided in a pixel for purposes other than formation of the multi-pixel structure. For example, in some cases, a plurality of sub-pixel electrodes constitute a pixel electrode to make it easy to repair any short circuit failure between the pixel electrode and the opposite electrode, or to prevent any short circuit failure from becoming highly visible. In this case, an equal voltage is supplied to the plurality of sub-pixel electrodes included in each pixel.

RELATED ART DOCUMENTS

Patent Documents

Patent Document 1: Japanese Patent Application Laid-Open Publication No. H11-242225 (U.S. Pat. No. 6,724,452)
Patent Document 2: Japanese Patent Application Laid-Open Publication No. 2000-155317 (U.S. Pat. No. 6,879,364)
Patent Document 3: Japanese Patent Application Laid-Open Publication No. 2004-62146 (U.S. Pat. No. 6,958,791)
Patent Document 4: Japanese Patent Application Laid-Open Publication No. 2008-65334

SUMMARY OF THE INVENTION

Problems to be Solved by the Invention

As described above, in MVA type liquid crystal display devices, if the supplemental structure described above is formed to suppress the disturbance in the liquid crystal molecule alignment near the edges of the pixel electrode or the sub-pixel electrode (not limited to those used in the multi-pixel structure), problems such as reduced transmission can rise.

Also, in recent years, liquid crystal display devices are offering an increasingly higher resolution, and pixel electrodes and sub-pixel electrodes (hereinafter collectively referred to as "pixel electrodes") are becoming smaller. As a result, the ratio of the parasitic capacitance $C_{sd}$ between the pixel electrode and the source bus line to the pixel capacitance (the sum of the liquid crystal capacitance $C_{lc}$ and the auxiliary capacitance CS) $C_{pix}$ is increasing. The higher ratio of the parasitic capacitance to the pixel capacitance causes problems such as shadowing, which lowers the display quality.

The present invention was devised to solve the problems described above, and is aiming at providing an MVA type liquid crystal display device that can minimize the ratio of the parasitic capacitance $C_{sd}$ to the pixel capacitance $C_{pix}$, and/or can suppress the display quality deterioration caused by disturbance in the alignment of liquid crystal molecules near the edge of the pixel electrode without using any above-mentioned supplemental structure.

Means for Solving the Problems

A liquid crystal display device of the present invention is an MVA type liquid crystal display device including a plurality of pixels arranged in a matrix of rows and columns, wherein each of the plurality of pixels includes a first substrate, a second substrate, a vertical alignment type liquid crystal layer sandwiched between the first substrate and the second substrate, at least one first electrode formed on the first substrate, a second electrode facing the at least one first electrode through the liquid crystal layer, a first domain control structure formed on the first substrate, and a second domain control structure formed on the second substrate, wherein the first domain control structure is a slit formed in the at least one first electrode, and the second domain control structure is a slit formed in the second electrode or a dielectric protrusion formed on the second electrode on the side facing the liquid crystal layer, wherein, when observed from a direction vertical to the first substrate, the first domain control structure includes a first linear component extending in a first direction and a second linear component extending in a second direction that is about 90° apart from the first direction, the second domain control structure includes a third linear component extending in the first direction and a fourth linear component extending in the second direction, wherein at least either the first and the second linear components or the third and the fourth linear components are present in plurality, wherein the first linear component and the third linear component are arranged alternately, and the second linear component and the fourth linear component are arranged alternately when observed from a direction vertical to the first substrate, wherein when a voltage is applied to the liquid crystal layer of a given pixel of the plurality of pixels, four domains, which differ in directions in which liquid crystal molecules fall by about 90° from one another, are formed between the first linear component and the third linear component and between the second linear component and the fourth linear component, wherein each of the plurality of pixels is a horizontally long pixel whose side extending in a row direction is longer than a side extending in a column direction, and wherein the at least one first electrode includes two first electrodes disposed side by side along the row direction. The two first electrodes included in each pixel are typically disposed between source bus lines adjacent to each other in the row direction.

Here, the first electrode is basically defined by the outer border of a conductive layer constituting the electrode, and is not related to the applied potential (if a slit that is continuous from the outer border (a thin, long strip-shaped notch) is formed in the first electrode, the slit is considered as a part of the first electrode). For example, when the outer borders of two conductive layers (ITO layers, for example) are independent from each other when observed from the side of the liquid crystal layer, the two conductive layers constitute two first electrodes even if a substantially equal voltage is supplied to the two conductive layers through one TFT drain. Of course, the number of TFTs connected to the conductive layer is independent of the number of the first electrodes. For example, the first electrode is a pixel electrode, and if each of the pixels holds a plurality of sub-pixel electrodes as in the case of liquid crystal display devices having the multi-pixel structure, each sub-pixel electrode corresponds to a first electrode.

In an embodiment, at least one of the two first electrodes includes a first corner section having a first edge, which is parallel to the row direction, and a second edge, which is parallel to the column direction, wherein the first substrate further includes an electrode layer overlapping a portion of at least either the first edge or the second edge of the first corner section. Of course, the electrode layer may be disposed to overlap a portion of the first edge of the first corner section and a portion of the second edge of the first corner section.

In an embodiment, the liquid crystal display device includes two auxiliary capacitances assigned to each of the plurality of pixels, wherein the two auxiliary capacitances each includes an auxiliary capacitance electrode electrically connected to one of the two first electrodes, and an auxiliary capacitance opposite electrode facing the auxiliary capacitance electrode through an insulating layer, and wherein the two auxiliary capacitance electrodes included in the respective two auxiliary capacitances are separate from each other, and a prescribed voltage is supplied to the electrodes through separate branch lines.

In an embodiment, said liquid crystal display device further includes an auxiliary capacitance assigned to each of the plurality of pixels, wherein the auxiliary capacitance includes an auxiliary capacitance electrode electrically connected to the at least one first electrode, and an auxiliary capacitance opposite electrode facing the auxiliary capacitance electrode through an insulating layer, and wherein the above-mentioned electrode layer is the auxiliary capacitance opposite electrode or the auxiliary capacitance electrode.

In an embodiment, the liquid crystal display device has two auxiliary capacitances assigned to each of the plurality of pixels, wherein the two auxiliary capacitances each includes an auxiliary capacitance electrode electrically connected to one of the two first electrodes, and an auxiliary capacitance opposite electrode facing the auxiliary capacitance electrode through an insulating layer, wherein the above-mentioned electrode layer is the auxiliary capacitance opposite electrode or the auxiliary capacitance electrode, and wherein a right edge of a left first electrode of the above-mentioned two first electrodes has a first protruding portion extending to the right, and a left edge of a right first electrode of the above-mentioned two first electrodes has a second protruding portion extending to the left, and a right edge of the first protruding portion and a left edge of the second protruding portion overlap the auxiliary capacitance electrode or the auxiliary capacitance opposite electrode.

In an embodiment, the electrode layer overlaps with a portion of the first domain control structure or a portion of the second domain control structure.

In an embodiment, the at least one first electrode has an edge parallel to the slit included in the at least one first electrode.

In an embodiment, the edge parallel to the slit included in the at least one first electrode intersects with the edge of the at least one first electrode extending parallel to the column direction, and with the edge of the at least one first electrode extending parallel to the row direction.

Another liquid crystal display device of the present invention is an MVA type liquid crystal display device and includes a plurality of pixels arranged in a matrix of rows and columns, wherein each of the plurality of pixels has a first substrate, a second substrate, a vertical alignment type liquid crystal layer sandwiched between the first substrate and the second substrate, at least one first electrode formed on the first substrate, a second electrode facing the at least one first electrode through the liquid crystal layer, a first domain control structure formed on the first substrate, and a second domain control structure formed on the second substrate, wherein the first domain control structure is a slit formed in the at least one first electrode, and the second domain control structure is a slit formed on the second electrode or a dielectric protrusion formed on the second electrode on the side facing the liquid crystal layer, wherein when observed from a direction vertical to the first substrate, the first domain control structure includes a first linear component extending in a first direction and a second linear component extending in a second direction which is about 90° apart from the first direction, and the second domain control structure includes a third linear component extending in the first direction and a fourth linear component extending in the second direction, wherein at least either the first and the second linear components or the third and the fourth linear components are present in plurality, wherein the first linear component and the third linear component are arranged alternately, and the second linear component and the fourth linear component are arranged alternately when observed from a direction vertical to the first substrate, wherein when a voltage is applied to the liquid crystal layer at a given pixel of the plurality of pixels, four domains, which differ in directions in which liquid crystal molecules fall by about 90° from one another, are formed between the first linear component and the third linear component and between the second linear component and the fourth linear component, wherein each of the plurality of pixels is a horizontally long pixel whose side extending in the row direction is longer than the side extending in the column direction, wherein the first direction and the second direction intersect with the row direction and the column direction, and wherein when observed from a direction vertical to the first substrate, the at least one first electrode includes an extended portion sandwiched by a first portion, which is an intersection of an edge of the at least one first electrode and the slit or an intersection of the edge of the at least one first electrode and an extended line of the slit closest to the edge, and a second portion, which is adjacent to the first portion of the at least one first electrode and also is an intersection of an edge of the at least one first electrode and the second domain control structure or an intersection of the edge of the at least one first electrode and an extended line of the second domain control structure closest to the edge, which extended portion protrudes in the column direction.

In an embodiment, the at least one first electrode includes two first electrodes arranged side by side along the row direction.

In an embodiment, the second substrate further includes a black matrix, wherein when observed from a direction vertical to the first substrate, a leading end of the extended portion in the row direction overlaps with the black matrix.

In an embodiment, the extended portion included in the at least one first electrode has an edge that is parallel to the slit intersecting with the edge of the first portion, or that is parallel to a direction in which the slit extends, which slits has an extended line intersecting with the edge of the first portion.

In an embodiment, the edge of the extended portion included in the at least one first electrode is continuous with the edge of the slit.

In an embodiment, the extended portion has an edge parallel to the row direction or the column direction.

In an embodiment, the extended portion is disposed close to a corner section of the at least one first electrode.

In an embodiment, the at least one first electrode has a notched section in an edge facing the extended portion of the at least one pixel electrode in a pixel adjacent in the row direction.

In an embodiment, the notched section has an edge parallel to the first direction or to the second direction.

Effects of the Invention

The present invention provides an MVA type liquid crystal display device that can reduce the ratio of a parasitic capacitance Csd to a pixel capacitance Cpix and/or can reduce the display quality deterioration caused by the disturbance in the alignment of the liquid crystal molecules near the edge of the pixel electrode without employing the above-mentioned supplemental structure.

DETAILED DESCRIPTION OF EMBODIMENTS

The configuration of an MVA type liquid crystal display device (hereinafter referred to as LCD) according to an embodiment of the present invention is described below. The present invention, however, is not limited to embodiments presented herein as examples.

In the MVA type LCD according to an embodiment described below as an example, a first substrate includes a TFT and a first electrode (sub-pixel electrode), and a second substrate includes a second electrode (opposite electrode). A first domain control structure formed on the first substrate is a slit formed in the first electrode, and a second domain control structure formed on the second substrate is a dielectric protrusion formed on the second electrode on the side facing the liquid crystal layer. As the second domain control structure, a slit formed in the second electrode may be used.

Figure 1:
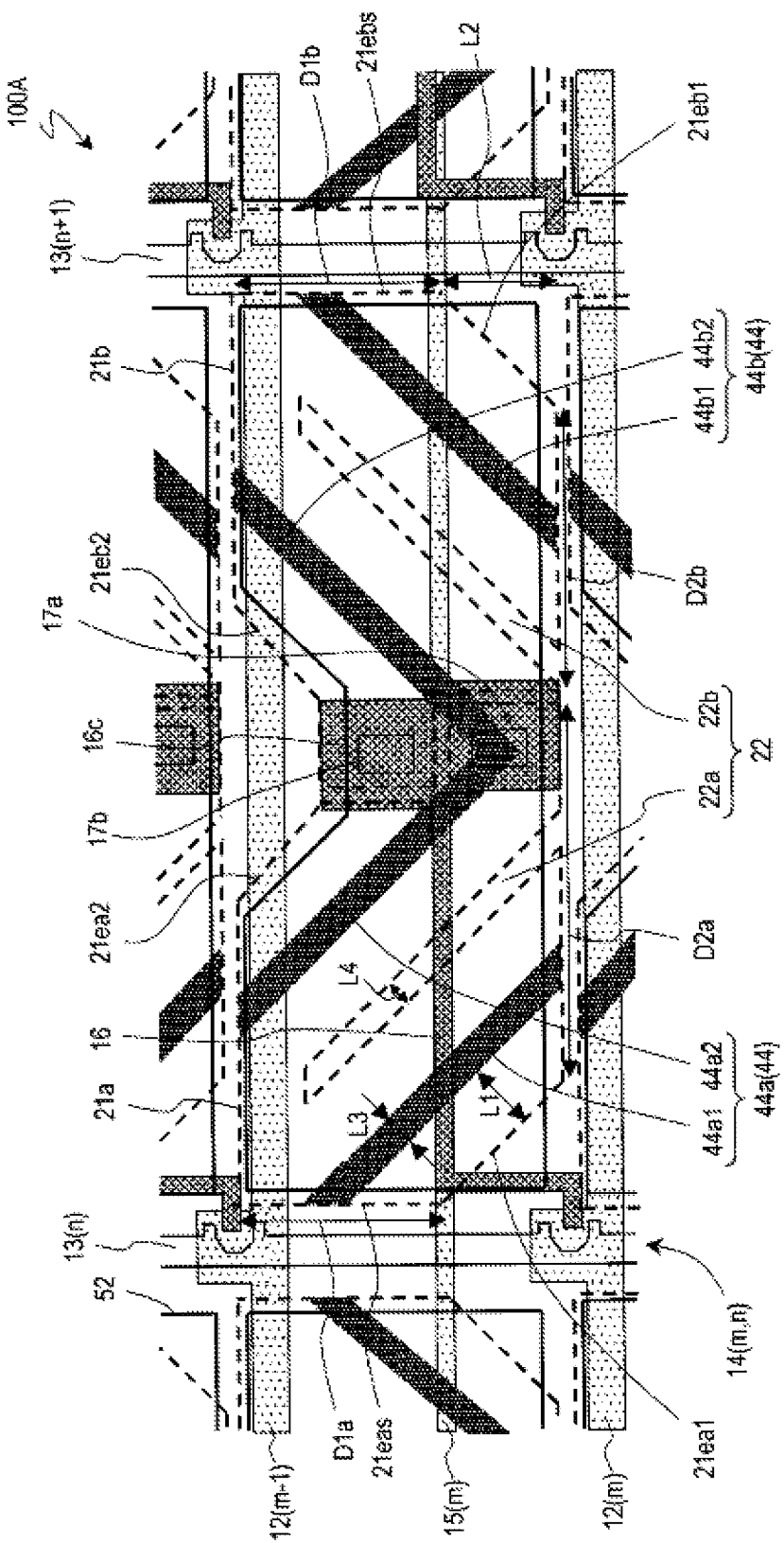
FIG. 1 is a plan view showing the configuration of an LCD 100A according to an embodiment of the present invention.

First, a configuration of an MVA LCD 100A according to an embodiment of the present invention is described with reference to FIG. 1. FIG. 1 is a plan view schematically showing an example of the basic configuration of the LCD 100A. In the figure, one of the plurality of pixels, which are arranged in a matrix, of the LCD 100A (the pixel located at the mth row and the nth column) and a portion of neighboring pixels are shown.

LCD 100A has a plurality of pixels including first electrodes (sub-pixel electrodes) 21a and 21b formed on a first substrate, a second electrode (opposite electrode, not shown) facing the first electrodes 21a and 21b and formed on a second substrate, and a vertical alignment type liquid crystal layer (not shown) sandwiched between the first electrodes 21a and 21b and the second electrode. The second electrode is provided commonly for a plurality of pixels, and is formed over the entire region shown in FIG. 1.

Here, in the vertical alignment type liquid crystal layer, when no voltage is applied, liquid crystal molecules of negative dielectric anisotropy are aligned approximately vertically to the surfaces of the first electrodes 21a and 21b and to the surface of the second electrode (87° to 90°, for example). Typically, the vertical alignment can be obtained by providing a vertical alignment film (not shown) on both the first electrodes 21a and 21b and the second electrode (and the dielectric protrusion) on the surface facing the liquid crystal layer.

The LCD 100A has horizontally long pixels arranged such that the long side of the approximately rectangular pixel is parallel to the row direction. As a result, as described below, the ratio of the parasitic capacitance Csd, which is disposed between the first electrodes 21a and 21b and the source bus line, to the pixel capacitance Cpix is smaller than that of a conventional LCD having vertically long pixels.

The two first electrodes 21a and 21b provided in each pixel of the LCD 100A are connected to a source bus line 13 through a TFT 14 (m, n). TFT 14 is turned ON/OFF by the gate signal supplied from the gate bus line 12 to the gate. The first electrodes 21a and 21b are connected to an auxiliary capacitance electrode 16c, which is an extended portion of the drain of TFT 14 and a drain lead-out wiring 16, inside contact holes 17a and 17b, respectively. When TFT 14 turns ON, the source signal voltage supplied from a source bus line 13 is supplied to the first electrodes 21a and 21b. The pixel structure of LCD 100A is not a multi-pixel structure.

In each pixel, pixel electrodes include the first electrode 21a and the first electrode 21b disposed side by side along the row direction. Between the first electrode 21a and the first electrode 21b, an auxiliary capacitance electrode 16c and an auxiliary capacitance opposite electrode, which is an extended portion of a CS bus line 15 (unitarily formed) are formed. The auxiliary capacitance opposite electrode is not shown here, because it has approximately the same shape as the auxiliary capacitance electrode 16c. The auxiliary capacitance opposite electrode constitutes an auxiliary capacitance (CS) together with the auxiliary capacitance electrode 16c, which the auxiliary capacitance opposite electrode faces through an insulating layer (gate insulating layer). The contact holes 17a and 17b are formed over the auxiliary capacitance.

The auxiliary capacitance opposite electrode and the auxiliary capacitance electrode 16c are formed to overlap a right-bottom corner section of the first electrode 21a, which includes an edge parallel to the row direction and an edge parallel to the column direction. That is, the auxiliary capacitance opposite electrode overlaps with at least a portion of the edge of the corner section that is parallel to the row direction, and at least a portion of the edge of the corner section that is parallel to the column section (here, the auxiliary capacitance opposite electrode overlaps with the both edges). Also, the auxiliary capacitance opposite electrode and the auxiliary capacitance electrode 16c are formed to overlap a space between the first electrode 21a and the first electrode 21b. Of the edges of the first electrode 21a and the first electrode 21b that are parallel to the row direction, the portions overlapping with the black matrix 52 is shielded from light by the black matrix 52. Therefore, the auxiliary capacitance opposite electrode and the auxiliary capacitance electrode 16c are not provided there.

Because the auxiliary capacitance opposite electrode, which is formed of a gate metal layer, and the auxiliary capacitance electrode 16c, which is formed of a source metal layer, are generally made of a light-shielding film (metal film), these electrode layers can be utilized as a light-shielding layer. Here, although the auxiliary capacitance opposite electrode and the auxiliary capacitance electrode 16c are used as the light-shielding layer for an example, alternatively, only one of them or other electrode layers may be used for the light-shielding purpose. Utilizing an electrode layer formed in the TFT substrate, such as the auxiliary capacitance opposite electrode or the auxiliary capacitance electrode 16c, as a light-shielding layer is advantageous, because this eliminates the need to form a separate light-shielding layer. Also, because the electrode layer formed in the TFT substrate constitutes a region that cannot be used for display anyway, if the region is utilized for light-shielding purpose, it is possible to prevent the reduction in the effective aperture ratio of the pixel (the ratio of the area of the portion transmitting light actually used for display to the area of the display region). Here, the gate metal layer refers to a layer including constituting elements formed using a metal film (including a laminated film) for forming the gate bus line and the gate electrode. Similarly, the source metal layer refers to a layer including constituting elements formed using a metal film (including a laminated film) for forming the source bus line and the source electrode.

A right-end edge of the first electrode 21a has a first protruding portion, which protrudes to the right, and a left-end edge of the first electrode 21b has a second protruding portion, which protrudes to the left. The right-end edge of the first protruding portion of the first electrode 21a overlaps with the auxiliary capacitance electrode 16c and the auxiliary capacitance opposite electrode, and the left-end edge of the second protruding portion of the first electrode 21b overlaps with the auxiliary capacitance electrode 16c and the auxiliary capacitance opposite electrode. The contact hole 17a is formed where the first protruding portion of the first electrode 21a overlaps with the auxiliary capacitance opposite electrode. Inside the contact hole 17a, the first electrode 21a is connected to the auxiliary capacitance electrode 16c. The contact hole 17b is formed where the second protruding portion of the first electrode 21b overlaps with the auxiliary capacitance opposite electrode. Inside the contact hole 17b, the first electrode 21b is connected to the auxiliary capacitance electrode 16c. The contact holes 17a and 17b are formed in an interlayer insulating film (transparent resin layer, for example) disposed between the auxiliary capacitance electrode 16c (source metal layer) and the first electrodes 21a and 21b.

As shown in FIG. 1, if the first protruding portion of the first electrode 21a and the second protruding portion of the first electrode 21b are disposed to mesh with each other along the row direction, the area (in particular, the width in the row direction) blocked from light by the auxiliary capacitance electrode 16c and the auxiliary capacitance opposite electrode can be reduced. As a result, the effective aperture ratio can be increased. That is, the LCD 100A has less area shielded from light by the auxiliary capacitance electrode 16c and by the auxiliary capacitance opposite electrode than, for example, a LCD 100D shown in FIG. 4.

Next, the configuration of the domain control structure of LCD 100A is described.

In the first electrodes 21a and 21b, slits 22 are formed as the first domain control structure, and on the second electrode on the side facing the liquid crystal layer, dielectric protrusions 44 are formed as the second domain control structure. The dielectric protrusions 44 and columnar spacers (not shown) are formed, for example, with a photosensitive resin on the second electrode (opposite electrode) of the second substrate.

When observed from a direction vertical to the first substrate, the slits 22, which are the first domain control structure disposed on the first electrodes 21a and 21b, have a first linear component 22a extending in a first direction and a second linear component 22b extending in a second direction, which is about 90° away from the first direction. The first electrode 21a has the first linear component 22a only, and the first electrode 21b has the second linear component 22b only. The first electrode 21a has edges 21ea1 and 21ea2, which are parallel to a slit 22a, and the first electrode 21b has edges 21eb1 and 21eb2, which are parallel to a slit 22b. The first direction and the second direction are the directions that intersect with the row direction and the column direction. Here, the azimuth angle of the first direction is 135° (or 315°), and azimuth angle of the second direction is 225° (or 45°). Polarizing axes of the two polarizing plates disposed in the crossed Nicols arrangement through the liquid crystal layer extend in the row direction (horizontal direction) and in the column direction (vertical direction).

The dielectric protrusions 44, which are the second domain control structure disposed on the second electrode (not shown) on the side facing the liquid crystal layer, have third linear components 44a1 and 44a2 (44a) extending in the first direction and fourth linear components 44b1 and 44b2 (44b) extending in the second direction.

When observed from a direction vertical to the first substrate, the first linear component 22a and the two third linear components 44a1 and 44a2 are arranged alternately, and the second linear component 22b and the two fourth linear components 44b1 and 44b2 are arranged alternately. Therefore, when a voltage is applied to the liquid crystal layer of the pixel, four domains, in which domains liquid crystal molecules fall in different directions that are about 90° apart, are formed between the first linear component 22a and the third linear components 44a1 and 44a2, and between the second linear component 22b and the fourth linear components 44b1 and 44b2. Further, four domains, in which liquid crystal molecules fall in different directions that are about 90° apart, are also formed between the edge 21ea1 of the first electrode 21a and the third linear component 44a1, between the edge 21ea2 of the first electrode 21a and the third linear component 44a2, between the edge 21eb1 of the first electrode 21b and the fourth linear component 44b1, and between the edge 21eb2 of the first electrode 21b and the fourth linear component 44b2.

The linear first and second domain control structures control the alignment such that liquid molecules fall in a direction perpendicular to the extending direction of the respective linear components. As a result, liquid crystal molecules located between the linear components disposed parallel with each other with a prescribed space in between fall roughly uniformly in the same direction. The edges 21ea1 and 21ea2 of the first electrode 21a and the edges 21eb1 and 21eb2 of the first electrode 21b function in a similar way as the first domain control structure.

An end portion of the slit 22a overlaps the black matrix 52, and end portions of the dielectric protrusion 44a2 and 44b2 overlap the auxiliary capacitance opposite electrode and the auxiliary capacitance electrode 16*c*. Therefore, even if the alignment of the liquid crystal molecules at these end portions of these domain control structure is disturbed, the display quality is not affected, because the end portions are blocked from the light by the black matrix 52 or the auxiliary capacitance opposite electrode and the auxiliary capacitance electrode 16*c*. In LCD 100A, the dielectric protrusion 44*a*2 and the dielectric protrusion 44*b*2 are linked together, but the dielectric protrusion 44*a*2 and the dielectric protrusion 44*b*2 may be separated on the auxiliary capacitance opposite electrode. When introducing the liquid crystal material, such configuration allows the liquid crystal material run through the space between the dielectric protrusion 44*a*2 and the dielectric protrusion 44*b*2 to spread in a stable manner. Also, the configuration provides a benefit that the alignment film can easily be applied uniformly. Here, the dielectric protrusion 44*a*2 and the dielectric protrusion 44*b*2 are preferably disposed such that the edges that are parallel to the column direction face with each other, and the space between the edges is preferably smaller than 8 μm. When the space between the edge of the dielectric protrusion 44*a*2 and the edge of the dielectric protrusion 44*b*2 is 8 μm or larger, the region where the alignment of the liquid crystal molecules is disturbed becomes undesirably large.

The domain control structure included in the liquid crystal display device according to an embodiment of the present invention, which is discussed here as an example, is basically the same as the domain control structure included in the LCD 100A, and may be omitted in the description below. However, the domain control structure of a liquid crystal display device according to an embodiment of the present invention is not limited to this. For example, the second domain control structure may be a slit. Also, discussed here as an example is a case that one of each of the first and second linear components and two of each of the third and fourth linear components are present. However, other arrangements may be possible as long as at least either the first and second linear components or the third and fourth linear components are present in plurality, and, when observed from a direction vertical to the first substrate, the first linear component and the third linear component are arranged alternately, and the second linear component and the fourth linear component are arranged alternately.

A slit may be configured as a plurality of slits arranged in a row (that is, a conductive layer exists between the slits) to stabilize the alignment of the liquid crystal molecules in the slit. A slit forms a diagonal electrical field along its edge, but it does not control or controls only minimally the alignment of the liquid crystal molecules located over the slit. Therefore, if the slit is long, for example, the alignment of liquid crystal molecules located over the slit becomes unstable, causing problems such as a slow response. The alignment of liquid crystal molecules can be stabilized by dividing the slit, i.e., by disposing a plurality of slits in a row. Preferably, the interval between the slits arranged in a row is smaller than 8 μm. If the interval is 8 μm or larger, the alignment of liquid crystal molecules located in the interval between the slits, where the conductive layer is present, provides an excessive influence on the display, and as a result can lower the display luminance.

Preferably, a row of the plurality of slits has at least two locations at which the conductive layer is present. This is to reduce the chance that the first electrode 21*a* or 21*b* is separated at the location where the slit is formed. For example, when one (long and thin) slit 22*a*, which is continuous with an edge of the first electrode 21*a*, is formed as in LCD 100A of FIG. 1, the conductive layer is present only at one location on a line extending from the slit 22*a*. As a result, if a line breakage occurs at that location, about half of the first electrode 21*a* stops functioning as an electrode.

Next, the reason that the ratio of the parasitic capacitance Csd, which is disposed between the first electrodes 21*a* and 21*b* and the source bus line 13 of the LCD 100A, to the pixel capacitance Cpix is smaller than that of a conventional LCD having vertically long pixels is described.

The parasitic capacitance Csd of the first electrodes 21*a* and 21*b* becomes larger as the first electrodes 21*a* and 21*b* and the source bus line 13 come close together through a dielectric body. This is because of the reduced thickness of the dielectric layer forming a capacitance. Also, the parasitic capacitance Csd of the first electrodes 21*a* and 21*b* becomes larger as a longer portion of the first electrodes 21*a* and 21*b* and of the source bus line 13 are disposed close to each other. This is because of the increased area of the pair of electrodes forming a capacitance.

On the other hand, the distance between the first electrodes 21*a* and 21*b* and the source bus line 13 is preferably small to increase the effective aperture ratio. That is, preferably, the parasitic capacitance Csd of the first electrodes 21*a* and 21*b* is made sufficiently small without increasing the distance between the first electrodes 21*a* and 21*b* and the source bus line 13, or with a reduced distance between the first electrodes 21*a* and 21*b* and the source bus line 13.

Because pixels of the LCD 100A are horizontally long pixels, the portion of the first electrodes 21*a* and 21*b* that is located close to the source bus line 13 is short. Therefore, the ratio of the parasitic capacitance Csd, which is located between the first electrodes 21*a* and 21*b* and the source bus line 13, to the pixel capacitance Cpix is smaller than that of the vertically long pixels.

Further, an edge 21*ea*1 of the first electrode 21*a* is formed to intersect with an edge of the first electrode 21*a* that is parallel to the column direction, and with an edge of the first electrode 21*a* that is parallel to the row direction. That is, the first electrode 21*a* is formed with the corner section partially removed. Consequently, the length D1*a* of the edge of the first electrode 21*a* extending in the column direction (the portion that is proximal to the source bus line 13(*n*)) 21*eas* is shortened by the length L2. Similarly, an edge 21*eb*1 of the first electrode 21*b* intersects with an edge of the first electrode 21*b* that is parallel to the column direction and with an edge of the first electrode 21*b* that is parallel to the row direction. That is, the first electrode 21*b* is formed with the corner section partially removed. Consequently, the length D1*b* of the edge 21*ebs* of the first electrode 21*b* extending in the column direction (the portion that is proximal to the source bus line 13(n+1)) is shortened by the length L2.

Also, because the edge 21*ea*1 of the first electrode 21*a* intersects with the edge of the first electrode 21*a* that is parallel to the row direction, the length D2*a* of the edge of the first electrode 21*a* that is parallel to the row direction (the portion proximal to the gate bus line 12(*m*)) is shortened by L2 (here, the removed portion is an isosceles right triangle with the base angles of 45 degrees). Similarly, because the edge 21*eb*1 of the first electrode 21*b* intersects with the edge of the first electrode 21*b* that is parallel to the row direction, the length D2*b* of the edge of the first electrode 21*b* that is parallel to the row direction (the portion proximal to the gate bus line 12(*m*)) is shortened by L2. Thus, by partially removing the corner section of the first electrodes 21*a* and 21*b*, the parasitic capacitance Cgd formed between the gate bus line 12(*m*) and the first pixel electrodes 21*a* and 21*b* can be reduced.

Contrary to Csd, Cgd of the first electrodes 21*a* and 21*b* tends to be larger with horizontally long pixels than with vertically long pixels. Therefore, in the LCD 100A, the first electrodes 21*a* and 21*b* of the pixel adjacent to the pixel in the mth row in the column direction (the pixel in the (m+1)th row) are disposed such that the electrodes overlap the gate bus line 12(*m*) (in FIG. 1, the first electrodes 21*a* and 21*b* of the pixel in the (m+1)th row overlaps the gate bus line 12(*m*)). As a result, the potential of the gate bus line 12(*m*) is suppressed from influencing Cgd of first electrodes 21*a* and 21*b* of the pixel in the mth row (current row). That is, the potential of the gate bus line 12(*m*) of the current row (mth row) is shielded with the first electrodes 21*a* and 21*b* of the pixel in the adjacent row ((m+1)th row) to reduce the Cgd value (the amount of charge actually stored is the product of the capacitance and the difference in potential, and here, the difference in potential is reduced). The larger the overlapping area of the gate bus line 12(*m*) and the first electrodes 21*a* and 21*b* of the pixel in the adjacent row ((m+1)th row), the effect of shielding becomes more significant. Therefore, the first electrodes 21*a* and 21*b* are preferably disposed to overlap with the entire width of gate bus line 12(*m*). This, however, may be modified as necessary. Also, a shield electrode may be provided in addition to the first electrodes 21*a* and 21*b*. The potential of the shield electrode is equal to that of the first electrodes 21*a* and 21*b* of the pixel in the current row, for example, and is connected to the drain lead-out wiring 16, for example.

The configuration and effect of the parasitic capacitances Csd and Cgd described above were verified by a simulation. Regarding this, the entire contents disclosed in Japanese Patent Application No. 2009-031789 are hereby incorporated herein by reference. An example of the pixel dimensions of the LCD 100A is as follows: row direction pitch: 190.5 μm; column direction pitch: 63.5 μm; rectangular area of the first electrodes 21*a* and 21*b* as a unified body without any removed portion: 173.5 μm×58.5 μm; width of the gate bus line and the source bus line: 5 μm, length L1=22 μm; length L2=30.25 μm; width L3=11 μm; and width L4=9 μm. Also, the length of the edge 21*ea*2 of the first electrode 21*a* and the edge 21*eb*2 of the first electrode 21*b* is 44.5 μm.

Next, the configuration of an MVA type LCD 100B according to an embodiment of the present invention is described with reference to FIG. 2. In the description below, same reference characters are used for configuration elements similar to those included in the LCD 100A shown in FIG. 1, and description of them may be omitted.

Figure 2:
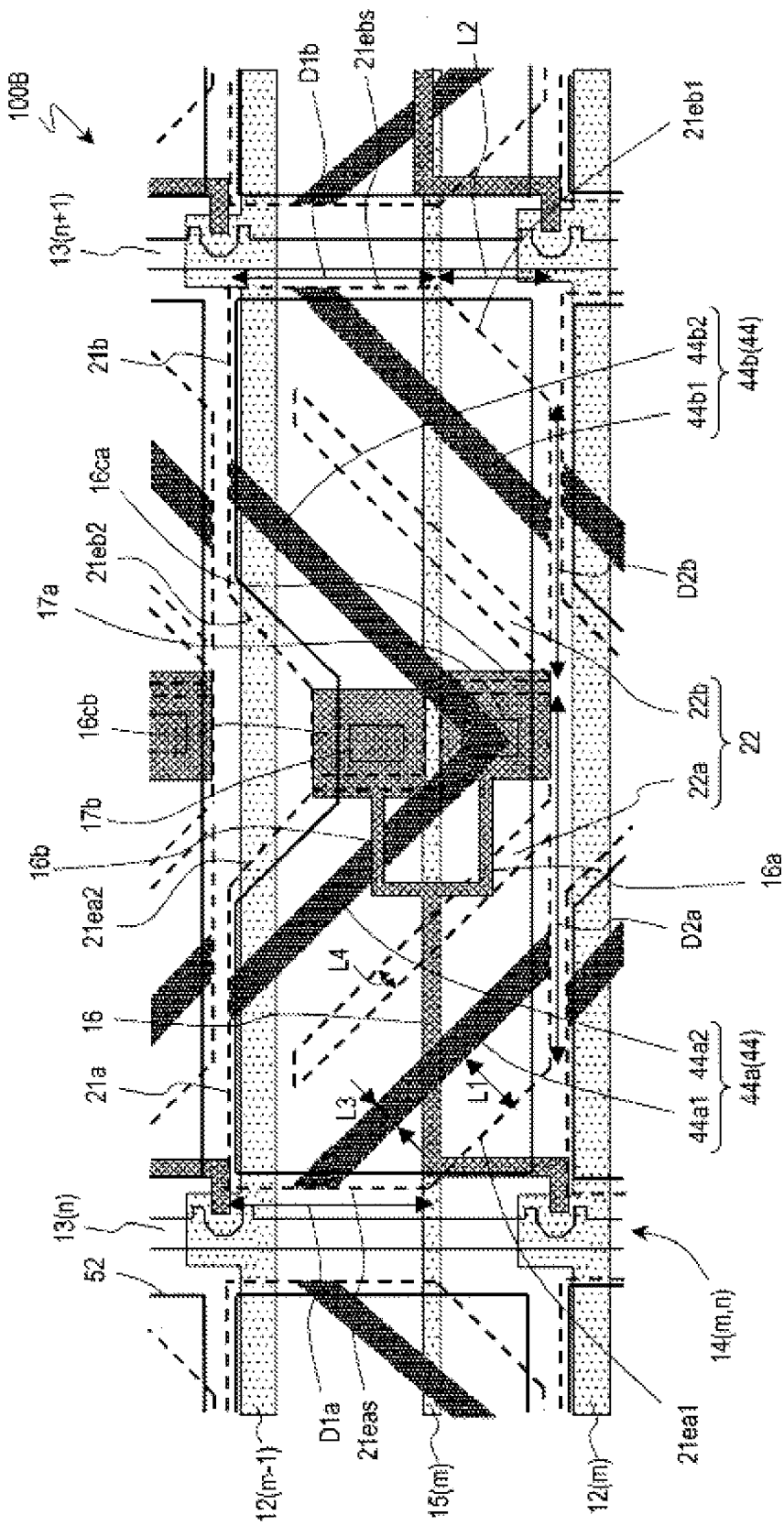
FIG. 2 is a plan view showing the configuration of an LCD 100B according to another embodiment of the present invention.

The LCD 100B shown in FIG. 2 is different from the LCD 100A regarding the configuration of the auxiliary capacitance. In the LCD 100B, the drain lead-out wiring 16 branches off to branch lines 16*a* and 16*b*. The branch line 16*a* is connected to the auxiliary capacitance electrode 16*ca*, and the branch line 16*b* is connected to the auxiliary capacitance electrode 16*cb*. The auxiliary capacitance electrode 16*ca* and the auxiliary capacitance electrode 16*cb* are separate from one another, and similarly, their corresponding auxiliary capacitance opposite electrodes (extended portion of the CS bus line, not shown) are also separate from one another. The rest of the structure is the same as that of the LCD 100A.

If a short circuit occurs between the first electrode 21*a* or 21*b* and the opposite electrode in the LCD 100B, only either the first electrode 21*a* and the first electrode 21*b* can electrically be isolated from the drain lead-out wiring 16 by cutting off the branch line 16*a* or 16*b*. That is, only either the first electrode 21*a* or 21*b* where a short circuit occurred can be isolated, and either the first electrode 21*a* or 21*b* where the short circuit did not occur can keep operating normally.

By employing such a configuration, short circuits between the first electrodes 21*a* and 21*b* and the opposite electrode can be repaired. As a result, the yield of the liquid crystal display device can be improved. This configuration can also be applied to liquid crystal display devices of other embodiments described below.

Figure 3:
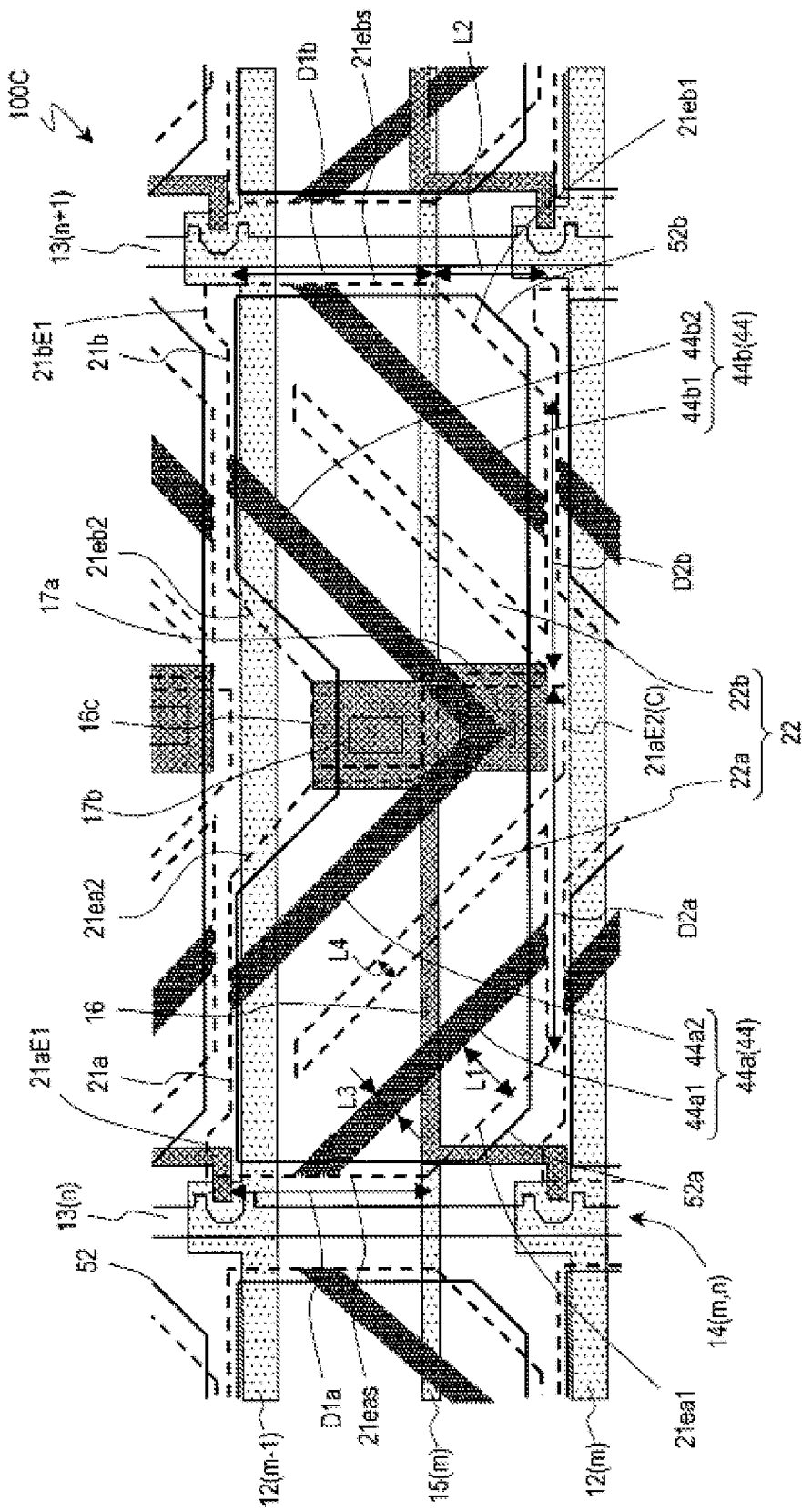
FIG. 3 is a plan view showing the configuration of an LCD 100C according to yet another embodiment of the present invention.

Next, with reference to FIG. 3, the configuration of an MVA type LCD 100C according to another embodiment of the present invention is described. LCD 100C is different from LCD 100A shown in FIG. 1 in that the first electrodes 21*a* and 21*b* have extended portions 21*a*E1, 21*a*E2(C), and 21*b*E1 protruding in the column direction. LCD 100C is also different from LCD 100A in that the black matrix 52 has a portion 52*a* additionally formed for the extended portion 21*a*E1, and a portion 52*b* additionally formed for the extended portion 21*b*E1.

When observed from a direction vertical to the first substrate, the extended portions 21*a*E1, 21*a*E2(C), and 21*b*E1 are provided in a region sandwiched by a first portion, where the edges of the first electrodes 21*a* and 21*b* intersect with the slit 22 or where the edges of the first electrodes 21*a* and 21*b* intersect with the extended line of the slit 22 closest to the edges, and by a second portion which is located adjacent to the first portion of the first electrodes 21*a* and 21*b* and where the edges of the first electrodes 21*a* and 21*b* intersect with the dielectric protrusion 44 or where the first electrodes 21*a* and 21*b* intersect with the extended line of the dielectric protrusion 44 closest to the edges.

For example, the first electrode 21*a* has an extended portion 21*a*E1, which is protruding in the column direction (upward in FIG. 3) and is sandwiched by the first portion where the upper edge of the first electrode 21*a* intersects with the extended line of the slit 22*a*, and by the second portion where the left edge of the first electrode 21*a* intersects with the dielectric protrusion 44*a*1.

Also, the first electrode 21*a* has an extended portion 21*a*E2(C), which is protruding in the column direction (rightward in FIG. 3) and is sandwiched by the first portion where the lower edge of the first electrode 21*a* intersects with the slit 22*a*, and by the second portion where the right (or lower) edge of the first electrode 21*a* intersects with the extended line of the dielectric protrusion 44*a*2.

Similarly, the first electrode 21*b* has an extended portion 21*b*E1, which is protruding in the column direction (upward in FIG. 3) and is sandwiched by the first portion where the upper edge of the first electrode 21*b* intersects with the extended line of the slit 22*b*, and by the second portion where the right edge of the first electrode 21*b* intersects with the dielectric protrusion 44*b*1.

The extended portion 21*a*E1 has an edge that is parallel to the direction in which the slit 22*a* extends (first direction), which slit 22*a* has an extended line intersecting with the edge of the first portion. The extended portion 21*a*E1 also has an edge that is parallel to the column direction.

Similarly, the extended portion 21*b*E1 has an edge that is parallel to the direction in which the slit 22*b* extends (second direction), which slit 22*b* has an extended line intersecting with the edge of the first portion. The extended portion 21*b*E1 also has an edge that is parallel to the column direction.

Also the extended portion 21*a*E2(C) has an edge that is parallel to the direction in which the slit 22*a* extends (first direction), which slit 22*a* intersects with the edge of the first portion. The edge of the extended portion 21*a*E2(C) is continuous with the edge of the slit 22*a*. The extended portion 21*a*E2(C) also has an edge that is parallel to the row direction.

As described above, the extended portions 21*a*E1, 21*a*E2(C), and 21*b*E1 have edges that are parallel to the direction in which the corresponding slit 22*a* or 22*b* extends. These edges provide an alignment control which is similar to that of the corresponding slits. On the other hand, the extended portions 21*a*E1, 21*a*E2(C), and 21*b*E1 also have edges that are parallel to the row direction or the column direction. Therefore, at the extended portions 21*a*E1, 21*a*E2(C), and 21*b*E1, the alignment of liquid crystal molecules is disturbed around the leading end of the row direction with which these edges intersect.

When observed from a direction vertical to the first substrate, leading ends of the extended portions 21*a*E1, 21*a*E2(C), and 21*b*E1 in the row direction are disposed to overlap the black matrix 52. As a result, if the alignment of liquid crystal molecules is disturbed at the leading ends of the extended portions 21*a*E1, 21*a*E2(C), and 21*b*E1 in the row direction, these portions are shielded from light by the black matrix 52. Therefore, the display does not receive any negative influence. The black matrix 52 is generally formed on the surface of the second substrate on the side facing the liquid crystal layer, and is formed of a metal layer or a black resin layer.

That is, in a liquid crystal display device according to the present embodiment, display quality deterioration caused by disturbance in the alignment of liquid crystal molecules can be suppressed by forming an extended portion protruding in the column direction in the first electrode and disposing the extended portion such that the leading end of the extended portion in the column direction overlaps the black matrix to confine the region of disturbed alignment of liquid crystal molecules formed near the first electrode within an area shielded from light by the black matrix.

As described above, the LCD 100C has three extended portions 21*a*E1, 21*a*E2(C), and 21*b*E1 for each pixel. Among them, the extended portions 21*a*E1 and 21*b*E1 are disposed near the corner sections of the pixel. Here, both extended portions are disposed near the respective corner sections towards the top side of the pixel.

The extended portion 21*a*E2(C) is disposed at the bottom of the pixel, around the center point in the row direction, close to a corner section of the first electrode 21*a*. Here, edges 21*ea*2 and 21*eb*2, which are upper edges of the first electrodes 21*a* and 21*b*, form a notched section that accommodates the extended portion 21*a*E2(C) disposed near the bottom edges of the first electrodes 21*a* and 21*b* of an adjacent pixel located above the pixel discussed above. The leading end of the extended portion 21*a*E2(C) of the first electrode 21*a* in this top adjacent pixel is disposed close to the notched section or disposed such that it is partially included in the notched section. Thus, by providing a notched section, a larger part of the extended portion can protrude in the column direction. However, because Cgd is increased if a larger part of the extended portion protrudes in the column direction, the amount of the protrusion should be determined in consideration of the trade off with the display quality.

Figure 4:
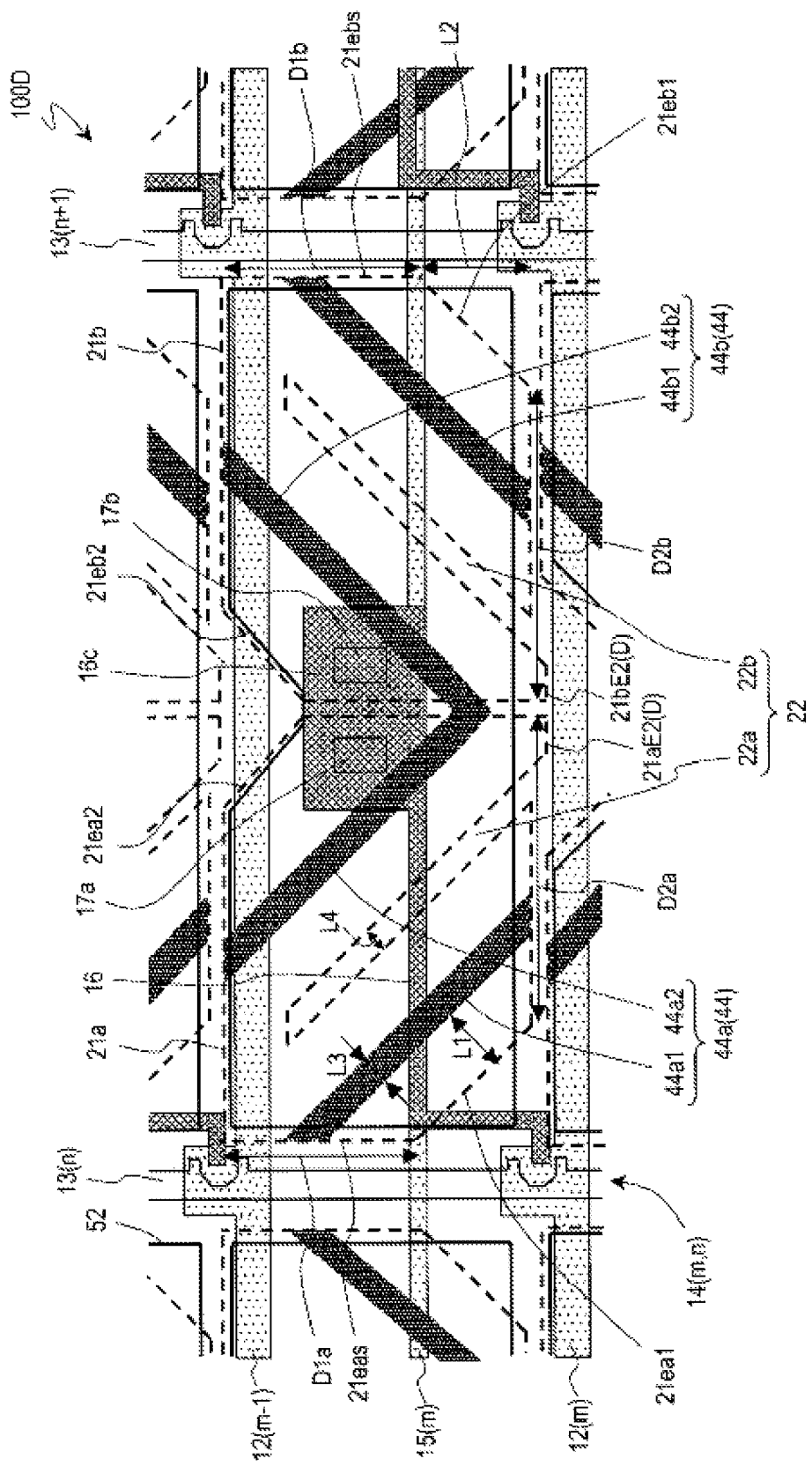
FIG. 4 is a plan view showing the configuration of an LCD 100D according to yet another embodiment of the present invention.

Next, the configuration of MVA type LCD 100D, which is another embodiment of the present invention, is described with reference to FIG. 4.

LCD 100D is different from LCD 100A shown in FIG. 1 regarding the shape of the first electrodes 21*a* and 21*b* and arrangement of the auxiliary capacitance.

The first electrodes 21*a* and 21*b* of LCD 100D are disposed such that they face each other with respect to a straight line at the midpoint of the pixel in the row direction. That is, unlike the first electrodes 21*a* and 21*b* of LCD 100A, no first protruding portion or second protruding portion is included. However, the first electrodes 21*a* and 21*b* of LCD 100D has extended portions 21*a*E2(D) and 21*b*E2(D) towards the bottom of the pixel, near the midpoint in the row direction. As with the case of the extended portion 21*a*E2(C) of LCD 100C shown in FIG. 3, the extended portions 21*a*E2(D) and 21*b*E2 (D) are disposed near the respective corner sections of the first electrodes 21*a* and 21*b* to confine the region of disturbed alignment of liquid crystal molecules formed near the corner sections of the first electrodes 21*a* and 21*b* within the area shielded from light by the black matrix, so that the display quality deterioration caused by disturbance in alignment of liquid crystal molecules occurring near the edges of first electrodes 21*a* and 21*b* can be suppressed.

The liquid crystal display devices 100A to 100D described above as examples all had two first electrodes 21*a* and 21*b* in a pixel, but the configuration is not limited to such. The number of first electrodes formed in a pixel may be three or more, or just one. To include a plurality of first electrodes in a pixel, a multi-pixel structure may be employed. The configuration disclosed in Patent Document 3, for example, may be used as a multi-pixel structure.

As described above, the present invention provides an MVA type liquid crystal display device that can, without employing the above-mentioned supplemental structure, suppress the display quality deterioration caused by disturbance of the alignment of liquid crystal molecules near the edges of the pixel electrodes while minimizing the ratio of the parasitic capacitance Csd to the pixel capacitance Cpix. Various configurations are possible to suppress the display quality deterioration caused by disturbance in the alignment of liquid crystal molecules. These are configurations including an electrode layer that shields at least a portion of the corner section of the first electrode from the light (LCD 100A and 100B), and a configuration in which an extended portion is provided for the first electrode to confine the area in which the alignment is disturbed within a region covered by the black matrix (LCD 100D). These configurations can be combined (LCD 100C) or used independently. The configurations may be modified appropriately according to the shape and the size of the pixel electrode.

INDUSTRIAL APPLICABILITY

The present invention can widely be used for MVA type liquid crystal display devices.

DESCRIPTION OF REFERENCE CHARACTERS 12 gate bus line
13 source bus line
14 TFT
15 CS bus line
16 drain lead-out wiring
16*c* auxiliary capacitance electrode
17*a*, 17*b* contact hole
21 first electrode (pixel electrode)
21*a*, 21*b* first electrode (sub-pixel electrode)
22 slit (opening) first domain control structure
22*a* first linear component (slit)
22*b* second linear component (slit)
44 dielectric protrusion (rib) second domain control structure
44*a*, 44*a*1, 44*a*2 third linear component (dielectric protrusion)
44*b*, 44*b*1, 44*b*2 fourth linear component (dielectric protrusion)

The invention claimed is:
1. An MVA type liquid crystal display device comprising a plurality of pixels arranged in a matrix of rows and columns, each of said plurality of pixels comprising: a first substrate; a second substrate; a vertical alignment type liquid crystal layer sandwiched between said first substrate and said second substrate; at least one first electrode formed on said first substrate; a second electrode facing said at least one first electrode through said liquid crystal layer; a first domain control structure formed on said first substrate; and a second domain control structure formed on said second substrate, wherein said first domain control structure is a slit formed in said at least one first electrode, and said second domain control structure is a slit formed in said second electrode or a dielectric protrusion formed on said second electrode on a side facing said liquid crystal layer, wherein, when observed from a direction vertical to said first substrate, said first domain control structure includes a first linear component extending in a first direction and a second linear component extending in a second direction which is about 90° angled from said first direction, and said second domain control structure includes a third linear component extending in said first direction and a fourth linear component extending in said second direction, wherein at least either said first and second linear components or said third and fourth linear components are present in plurality, wherein said first linear component and said third linear component are arranged alternately, and said second linear component and said fourth linear component are arranged alternately when observed from a direction vertical to said first substrate, wherein when a voltage is applied to said liquid crystal layer at a given pixel of said plurality of pixels, four domains that differ in directions in which liquid crystal molecules fall by about 90° from one another are formed between said first linear component and said third linear component and between said second linear component and said fourth linear component, wherein each of said plurality of pixels is a horizontally long pixel whose side extending in a row direction is longer than the side extending in a column direction, and wherein said at least one first electrode includes two first electrodes disposed side by side along the row direction.

2. The liquid crystal display device according to claim 1, wherein at least one of said two first electrodes includes a first corner section that has a first edge, which is parallel to the row direction, and a second edge, which is parallel to the column direction, and wherein said first substrate further includes an electrode layer overlapping a portion of at least either said first edge or said second edge of said first corner section.

3. The liquid crystal display device according to claim 1, further comprising two auxiliary capacitances assigned to each of said plurality of pixels, wherein said two auxiliary capacitances each includes an auxiliary capacitance electrode electrically connected to one of said two first electrodes, and an auxiliary capacitance opposite electrode facing said auxiliary capacitance electrode through an insulating layer, and wherein said auxiliary capacitance electrodes included in respective said two auxiliary capacitances are separate from each other, and a prescribed voltage is supplied to the electrodes through separate branch lines.

4. The liquid crystal display device according to claim 2, further comprising an auxiliary capacitance assigned to each of said plurality of pixels, wherein said auxiliary capacitance includes an auxiliary capacitance electrode electrically connected to said at least one first electrode, and an auxiliary capacitance opposite electrode facing said auxiliary capacitance electrode through an insulating layer, and wherein said electrode layer is said auxiliary capacitance opposite electrode or said auxiliary capacitance electrode.

5. The liquid crystal display device according to claim 2, further comprising two auxiliary capacitances assigned to each of said plurality of pixels, wherein said two auxiliary capacitances each includes an auxiliary capacitance electrode electrically connected to one of said two first electrodes, and an auxiliary capacitance opposite electrode facing said auxiliary capacitance electrode through an insulating layer, wherein said electrode layer is said auxiliary capacitance opposite electrode or said auxiliary capacitance electrode, and wherein a right edge of a left first electrode of said two first electrodes has a first protruding portion extending to the right, a left edge of a right first electrode of said two first electrodes has a second protruding portion extending to the left, and a right edge of said first protruding portion and a left edge of said second protruding portion overlap with said auxiliary capacitance electrode or said auxiliary capacitance opposite electrode.

6. The liquid crystal display device according to claim 2, wherein said electrode layer overlaps a portion of said first domain control structure or a portion of said second domain control structure.

7. The liquid crystal display device according to claim 1, wherein said at least one first electrode has an edge parallel to said slit included in said at least one first electrode.

8. The liquid crystal display device according to claim 7, wherein the edge parallel to said slit included in said at least one first electrode intersects with an edge of said at least one first electrode extending parallel to the column direction, and with an edge of said at least one first electrode extending parallel to the row direction.

9. An MVA type liquid crystal display device comprising a plurality of pixels arranged in a matrix of rows and columns, each of said plurality of pixels comprising: a first substrate; a second substrate; a vertical alignment type liquid crystal layer sandwiched between said first substrate and said second substrate; at least one first electrode formed on said first substrate; a second electrode facing said at least one first electrode through said liquid crystal layer; a first domain control structure formed on said first substrate; and a second domain control structure formed on said second substrate, wherein said first domain control structure is a slit formed in said at least one first electrode, and said second domain control structure is a slit formed in said second electrode or a dielectric protrusion formed on said second electrode on a side facing said liquid crystal layer, wherein, when observed from a direction vertical to said first substrate, said first domain control structure includes a first linear component extending in a first direction and a second linear component extending in a second direction which is about 90° apart from said first direction, and said second domain control structure includes a third linear component extending in said first direction and a fourth linear component extending in said second direction, wherein at least either said first and said second linear components or said third and said fourth linear components are present in plurality, wherein said first linear component and said third linear component are arranged alternately, and said second linear component and said fourth linear component are arranged alternately when observed from a direction vertical to said first substrate, wherein when a voltage is applied to said liquid crystal layer at a given pixel of said plurality of pixels, four domains that differ in directions in which liquid crystal molecules fall by about 90° from one another are formed between said first linear component and said third linear component and between said second linear component and said fourth linear component, wherein each of said plurality of pixels is a horizontally long pixel whose side extending in the row direction is longer than the side extending in the column direction, wherein said first direction and said second direction intersect with said row direction and said column direction, and wherein when observed from a direction vertical to said first substrate, said at least one first electrode includes an extended portion sandwiched by a first portion, which is an intersection of an edge of said at least one first electrode and said slit or an intersection of the edge of said at least one first electrode and an extended line of said slit closest to the edge, and a second portion, which is adjacent to said first portion of said at least one first electrode and also is an intersection of an edge of said at least one first electrode and said second domain control structure or an intersection of the edge of said at least one first electrode and an extended line of said second domain control structure closest to the edge, which extended portion protrudes in the column direction.

10. The liquid crystal display device according to claim 9, wherein said at least one first electrode includes two first electrodes arranged side by side along the row direction.

11. The liquid crystal display device according to claim 9, wherein said second substrate further includes a black matrix, and wherein when observed from a direction vertical to said first substrate, a leading end of said extended portion in the row direction overlaps said black matrix.

12. The liquid crystal display device according to claim 9, wherein said extended portion included in said at least one first electrode has an edge parallel to said slit intersecting with the edge of said first portion, or parallel to a direction in which said slit, whose extended line intersects with said edge of said first portion, extends.

13. The liquid crystal display device according to claim 12, wherein said edge of said extended portion included in said at least one first electrode is continuous with an edge of said slit.

14. The liquid crystal display device according to claim 9, wherein said extended portion has an edge parallel to the row direction or the column direction.

15. The liquid crystal display device according to claim 9, wherein said extended portion is disposed close to a corner section of said at least one first electrode.

16. The liquid crystal display device according to claim 9, wherein said at least one first electrode has a notched section in an edge facing said extended portion of said at least one pixel electrode in a pixel adjacent in the row direction.

17. The liquid crystal display device according to claim 16, wherein said notched section has an edge parallel to said first direction or said second direction.

* * * * *